(12) United States Patent
de Rodas et al.

(10) Patent No.: US 9,237,759 B1
(45) Date of Patent: Jan. 19, 2016

(54) FEED INTAKE ENHANCER FOR LACTATING ANIMALS

(75) Inventors: Brenda de Rodas, O'Fallon, MO (US); Michael S. Burr, Marthasville, MO (US)

(73) Assignee: Purina Mills, LLC, Shoreview, MN (US)

( * ) Notice: Subject to any disclaimer, the term of this patent is extended or adjusted under 35 U.S.C. 154(b) by 1559 days.

(21) Appl. No.: 12/607,603

(22) Filed: Oct. 28, 2009

Related U.S. Application Data

(63) Continuation of application No. 12/347,290, filed on Dec. 31, 2008, now abandoned.

(51) Int. Cl.
| | | |
|---|---|---|
| *A23K 1/175* | (2006.01) | |
| *A23K 1/18* | (2006.01) | |
| *A23L 1/304* | (2006.01) | |

(52) U.S. Cl.
CPC .............. *A23K 1/1751* (2013.01); *A23K 1/184* (2013.01); *A23L 1/304* (2013.01)

(58) Field of Classification Search
USPC ................................. 426/635, 623, 807, 2, 74
IPC ...................... A23K 1/1751,1/184; A23L 1/304
See application file for complete search history.

(56) References Cited

U.S. PATENT DOCUMENTS

| | | | |
|---|---|---|---|
| 4,452,779 A | | 6/1984 | Cockerill |
| 4,839,171 A | | 6/1989 | Nelson |
| 6,485,765 B1 | * | 11/2002 | Block et al. ........... 426/74 |
| 2002/0127259 A1 | * | 9/2002 | Orthoefer ............ 424/409 |
| 2003/0068359 A1 | * | 4/2003 | Register ............... 424/442 |
| 2004/0058003 A1 | * | 3/2004 | Rosenberg et al. ...... 424/486 |

FOREIGN PATENT DOCUMENTS

| | | | | |
|---|---|---|---|---|
| SU | 1489693 A | * | 6/1989 | |
| SU | 1526626 A | * | 12/1989 | |
| WO | WO 8804930 A1 | * | 7/1988 | |

OTHER PUBLICATIONS

Rick Jones, "Practical Swine Feeding Ideas" downloaded from internet archive dated Oct. 11, 2006, http://www.animalgenome.org/edu/PIH/prod_growing.html, dated May 1995, The University of Georgia College of Agricultural & Environmental Sciences Cooperative Extension Service.*
Stevenson et al. J Anim. Sci. vol. 16, pp. 877-884, 1957.*
Bouchard et al. Journal of Dairy Sci., vol. 56, No. 10, pp. 1276-1282, 1973.*
Breytenbach ("Sulphur in Ruminant Nutrition", downloaded from http://en.engormix.com/MA-dairy-cattle/nutrition/articles/sulphur-ruminant-nutrition-t77/p0.htm dated 1999, 5 pages.*
German et al. Bulletin C274, South Dakota University and USDA, May 2008, 12 pages.*
Libal et al. J. Anim. Sci, vol. 41(6), pp. 1542-11545, 1975.*
"Animal Environmental requirements" (downloaded from www.fao.org/docrep/s1250e/s1250e10.htm. 1986, 8 pages.*
"Sodium Sulphate", downloaded from www.apps.kemi.se/lodessok/floden/kemamne_eng/natriumsulfat_eng.htm, 3 pages, dated Dec. 18, 2006.*
Schneider et al. J Dairy Sci. 1996, vol. 69(1), pp. 99-110, abstract.*
Mercier et al. dated Apr. 18, 2008, 3 pages, downloaded from http://www.cabi.org/animalscience/Uploads/File/AnimalScience/additionalFiles/WPSA_files/mercier.pdf.*
Guan et al. ASA Technical Bulletin, vol. SW 15/1997, pp. 1-7.*
Lindemann, D. E.,et al. "Hints concerning the dosage of Glauber's salt for breeding sows." DTW. Deutsche tierärztliche Wochenschrift 102.2 (1995): 73.*
"Swine Nutrition Guide", Nebraska Coopperative Extension, downloaded from rais.ornl.gov/documents/ec273.pdf, dated Jul. 15, 2000, 45 pages.*
Rick Jones, "The Pig Site" downloaded from www.thepigsite.com/articles/1101/farrowing-and-lactation-in-the-sow-and-gilt, Jan. 2001, 7 pages.*

* cited by examiner

*Primary Examiner* — Chhaya Sayala
(74) *Attorney, Agent, or Firm* — Dorsey & Whitney LLP; Bridget M. Hayden

(57) ABSTRACT

Methods and compositions are provided for increasing the feed intake of lactating animals. Incorporation of sodium sulfate decahydrate (glauber salts) into animal feed enhances the feed intake of lactating animals. Glauber salts are particularly effective as feed intake enhancers when the lactating animals are under heat stress conditions. Lactating animals provided with a diet supplemented with glauber salts in the farrowing crate until weaning show an increase in the average daily feed intake compared to animals without glauber salts in their diet.

10 Claims, 3 Drawing Sheets

Graph 1. Effect of Glauber salts on sow feed intake (BS-151 Grp 1)

Graph 1. Effect of Glauber salts and room temperature on daily feed intake (BS-152)

FEED INTAKE ENHANCER FOR LACTATING ANIMALS

CROSS-REFERENCE TO RELATED APPLICATION

The present application is a continuation of and claims priority of U.S. patent application Ser. No. 12/347,290, filed Dec. 31, 2008, the content of which is hereby incorporated by reference in its entirety.

BACKGROUND OF THE INVENTION

One of the challenges faced by swine producers is feeding of lactating animals. Generally, sows do not consume enough feed during lactation to maintain their body weight. There is a strong correlation between sow weight loss during lactation and subsequent reproductive performance. Each additional unit of feed consumed by a sow during lactation can be used to preserve body weight and/or synthesize milk. Increasing feed intake of sows during lactation can lead to improved performance of breeding herds for swine producers.

Glauber salts (Sodium sulfate decahydrate; $Na_2SO4.10H_2O$), also known as sal mirabilis (miraculous salt), have historically been used as a mild laxative. It gently cleans the intestinal lining without dehydrating it. In swine production, Glauber salts are commonly used to reduce constipation in gilts and sows during and after farrowing.

The anhydrous form of sodium sulfate has been used to remove accumulation of fluids from the mammary tissue of a lactating animal. (See U.S. Pat. No. 4,452,779 to Cockerill) Sodium sulfate anhydrous, however, decreases the palatability of feed. Animal feed with high amounts of sodium can reduce the feed intake in animals. (See U.S. Pat. No. 4,839,171 to Nelson, M. J.)

SUMMARY OF THE INVENTION

In a first aspect, the present invention includes a method of feeding lactating animals. The method includes providing lactating animals an animal feed that includes sodium sulfate decahydrate having a concentration between about 0.3 percent by weight and about 2.5 percent by weight. The animal feed is provided from farrowing to weaning.

In another aspect, the present invention also includes a method of enhancing feed intake of lactating animals during heat stress. The method includes providing animal feed that includes sodium sulfate decahydrate wherein the concentration of the sodium sulfate decahydrate in the animal feed is between about 0.3 percent by weight and about 2.5 percent by weight.

In yet another aspect, the present invention includes a method of making animal feed. The method includes incorporating sodium sulfate decahydrate into animal feed wherein the concentration of the sodium sulfate decahydrate in the animal feed is between about 0.3 percent by weight and about 2.5 percent by weight.

In a further aspect, the present invention includes a feed mix composition for lactating animals. The composition includes sodium sulfate decahydrate wherein the concentration of the sodium sulfate decahydrate in the composition is less than about 50 percent by weight.

In yet a further aspect, the present invention includes animal feed for lactating animals during heat stress. The animal feed includes a grain based animal feed and sodium sulfate decahydrate at a concentration of between about 0.3 percent by weight and about 2.5 percent by weight of the animal feed.

DETAILED DESCRIPTION OF ILLUSTRATIVE EMBODIMENTS

Figure 1:
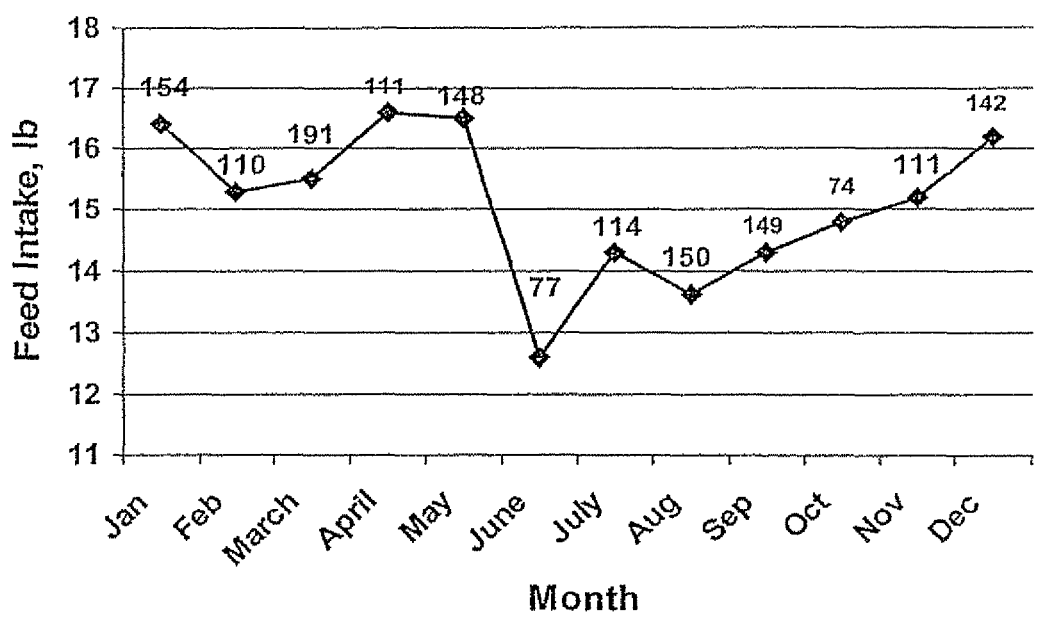
FIG. 1 shows the lactation feed intake by month. The numbers over the lines indicate the number of litters used to collect the data.

The present invention includes the use of sodium sulfate decahydrate as an animal feed intake enhancer. Addition of sodium sulfate decahydrate (glauber salts) to the diets of lactating animals can significantly increase the amount of feed consumed by a lactating animal. Compositions with the glauber salts can be combined with animal feed to increase the average daily feed intake of lactating animals. Glauber salts are particularly effective as feed intake enhancers when the lactating animals are under heat stress, i.e. during the summer months.

It has been surprisingly found that the incorporation of sodium sulfate decahydrate to animal feed increases the feed intake of lactating animals such as sows. This increase in feed intake can lead to improvement in sow and litter performance and higher productivity of a breeding herd. Moreover, the feed intake is enhanced during warm weather. Generally, weight loss in lactating animals is more pronounced during warm weather. The present compositions and methods can advantageously be used to enhance feed intake in lactating animals when ambient temperatures are greater than about 72° F.

Sodium sulfate decahydrate is commonly referred to as glauber salts and the two terms will be used interchangeably herein.

The present invention includes a variety of feed intake enhancing compositions. All of the feed intake enhancing compositions of the present invention include sodium sulfate decahydrate. The feed intake enhancing compositions can be, for example, a premix, a feed mix, or a complete animal feed.

In some embodiments, the feed intake enhancing compositions can include a premix. The premix generally includes sodium sulfate decahydrate and a carrier. A variety of carriers are available and known in the art and these include magnesium mica, calcium carbonate, rice hulls, soybean meal, beet meal and the like. In some preferred embodiments, magnesium mica is used as a carrier. The premix can also include other components such as mineral oil, mold inhibitors and the like. The concentration of sodium sulfate decahydrate in the premix can vary. Preferably, the concentration of sodium sulfate decahydrate is between about 40 percent by weight and about 60 percent by weight. More preferably, the concentration of sodium sulfate decahydrate in the premix is about 50 percent by weight. The concentration of the carrier in the premix can vary is generally between about 40 percent and 60 percent by weight.

In some embodiments, the feed intake enhancing compositions can be feed mix compositions that include feed components combined with a premix composition described above. The feed mix compositions generally include sodium sulfate decahydrate with a carrier and a variety of feed components. The amount of sodium sulfate decahydrate in the feed mix composition can vary. Generally, the sodium sulfate decahydrate is less than about 50 percent by weight of the feed mix composition. Feed mix compositions containing 50 percent by weight or more can form large clumps and are not particularly amenable to use for embodiments utilizing bulk flow techniques. Preferably, the concentration of the sodium sulfate decahydrate is less than about 40 percent by weight of the feed mix composition. More preferably, the concentration of the sodium sulfate decahydrate is between about 12.5 percent by weight and about 25 percent by weight of the composition.

The feed mix compositions may include a number of other feed components include grains, salts, fat, animal protein products, trace minerals and other components found in animal feed. Grains or grain products can include, for example, wheat, corn, oat, soymeal, and the like. Fats can include, for example, yellow grease, soybean oil, corn oil and the like. In one exemplary embodiment, corn, soymeal, calcium carbonate, plasma protein and choice white grease were included in the compositions.

The feed mix compositions of the present invention that include the glauber salts can be combined with complete animal feed to obtain improved animal feed that increases sow feed intake particularly during heat stress. The feed mix is generally blended with complete animal feed at a ratio based on a desired percentage of sodium sulfate decahydrate in the animal feed. The complete animal feed can be, for example, any number of commercially available animal feed including Ultracare™Lactation90, Ultracare™Lactation100, Ultracare™Lactation110 obtained from Land O'Lakes Purina Feed. In some embodiments, the feed mix composition may be combined with the desired complete animal feed at a ratio of between about 25 pounds per ton to about 75 pounds per ton of animal feed. In one preferred embodiment, the feed mix composition is combined with the animal feed at about 50 pounds per ton of animal feed.

The feed intake enhancing animal feed of the present invention includes sodium sulfate decahydrate at varying concentrations. Generally, the concentration of the sodium sulfate decahydrate in the animal feed is less than about 10 percent by weight. The concentration of the sodium sulfate decahydrate in the animal feed can be between about 0.3 percent by weight to about 2.5 percent by weight. Preferably, the concentration is between about 0.3 percent by weight and 1.25 percent by weight of animal feed and more preferably the concentration is between about 0.6 percent by weight and about 0.7 percent by weight.

The feed intake enhancing compositions are preferably orally administered to the animals. The compositions can be administered to a variety of agricultural lactating animals such as cows, sows and the like. Preferably, the lactating animals are sows. The use of sodium sulfate decahydrate to increase feed intake in other animals is also within the scope of this invention.

The feed intake enhancing compositions may be packaged for future use. If the composition is to be packaged for future use, it is preferable that the packaging be performed on the same day that the sodium sulfate decahydrate is added to the composition. Sodium sulfate decahydrate can release moisture when exposed to heat, thus, allowing the compositions to be exposed to heat for long periods, such as in bins, may result in clumping.

The present invention also includes a method of feeding lactating animals by providing the feed intake enhancing animal feeds described above. The animals can be provided the improved animal feed during farrowing. This intake enhancing animal feed can be used on a daily basis until the end of lactation, i.e. weaning. The period from farrowing until weaning (lactation period) can vary between about 14 days and about 28 days. Currently, the lactation period is generally between about 16 days and about 24 days. There is some variability in the duration of the lactation period but the animal feed of the present invention can be fed to animals throughout the lactation period whatever the duration.

The improved animal feed described above is provided to sows ad libitum. Sows can generally consume, on average, about 12 lbs of animal feed per day during the lactation period. The amount of animal feed consumed by the sows generally increases as the sow progresses through the lactation period. Preferably, the amount of animal feed consumed by sows in the last days (after day 10) of the lactation period is, on average, at least about 14 lbs of animal feed per day. More preferably, the amount of animal feed consumed by sows in the last days of the lactation period is between about 14 lbs of animal feed per day and about 28 lbs of animal feed per day.

With respect to Glauber salts, preferably, the sows consume at least about 1.0 ounces per day of the glauber salts. More preferably, the sows consume at least about 1.2 ounces per day of the glauber salts.

The average daily feed intake (ADFI) of the sows generally increases when the sows are provided with the feed intake enhancing animal feed described above. Preferably, the ADFI of the sows increases by at least about 5 percent and more preferably, the ADFI of the sows increases by at least about 10 percent when compared to the ADFI of sows that are fed the control animal feed, i.e. without the glauber salts.

The methods disclosed herein enhance the feed intake of lactating animals particularly when the animals are subjected to heat stress. Animals generally encounter heat stress during the summer months when the ambient temperature of the holding facility of sows increases. Heat stress, as used herein, refers to conditions when the animals are at temperatures greater than about 72° F. During heat stress, the feed intake of the lactating animals decreases. FIG. 1 shows the feed intake of lactating sows over the course of the year. The numbers over the line indicates the number of litters that were used to compile the data. The feed intake drops dramatically in June with the onset of summer and starts increasing slowly after September.

During conditions of heat stress, lactating animals are fed the feed intake enhancing animal feed of the present invention. The animal feed with a sodium sulfate decahydrate concentration of between about 0.3 percent by weight and about 2.5 percent by weight can increase the feed intake of lactating sows during the lactation period. The method includes providing the improved animal feed ad libitum throughout the lactation period.

The feed intake of the lactating sows during conditions of heat stress increases with the addition of sodium sulfate decahydrate in the animal feed. Preferably, the lactating sows consume, on average, at least about 13 lbs per day during the last days of the lactation period. More preferably, the lactating sows consume, on average, at least about 14 lbs per day during the last days of the lactation period. In preferred embodiments, the ADFI of the lactating sows increases by at least about 5 percent and, in more preferred embodiments, by at least about 10 percent when compared to the ADFI of sows that are fed the control diet.

A method of making the improved animal feed is also included in the present invention. The method includes incorporating sodium sulfate decahydrate into animal feed. The concentration of the sodium sulfate decahydrate in the animal feed is as described above. Generally, the animal feed can be made by combining the feed mix compositions described above with a desired complete animal feed. The amount of the feed mix composition combined with a ton of complete animal feed can vary but is generally between about 25 lbs of the feed mix composition per ton of animal feed and about 75 lbs of the feed mix composition per ton of animal feed. In preferred embodiments, about 50 lbs of the feed mix composition is combined with about a ton of animal feed.

Compositions that include sodium sulfate decahydrate can form clumps easily, particularly when exposed to heat. Preferably, the feed intake enhancing compositions when combined with the animal feed are substantially free of clumps. In some embodiments, if the compositions includes clumps, the clumps can be broken up by mechanical agitation, for example, by hammer blows.

EXAMPLES

Example 1

This study was conducted to evaluate the effect of a Glauber salt mix on sow lactation feed intake and on sow and litter performance.

Procedures:

A total of 26 sows (GPK35; Monsanto Choice Genetics) from two farrowing groups (13 sows per treatment) were used. Sows were moved to the farrowing crates (d 109 of gestation) and continued through lactation. Two dietary treatments were evaluated and consisted of:
1) A corn control diet (Table 1) and,
2) A test diet as in (1) but with glauber salt premix

TABLE 1

Composition of experimental diets

| Ingredient | Treatment | |
|---|---|---|
| | Control 1 | Test Diet (glauber salt) 2 |
| Corn | 61.28 | 60.03 |
| Vegetable Protein | 30.47 | 30.47 |
| Fat | 3.33 | 3.33 |
| Minerals and Vitamins | 4.25 | 4.25 |
| Lysine HCL | 0.07 | 0.07 |
| Antibiotics | 0.5 | 0.5 |
| Premix with 50% Glauber Salts | 0 | 1.25 |
| Others (such as phytogenic additives) | 0.1 | 0.1 |
| | 100.00 | 100.00 |

All nutrients were supplied in the diets to meet or exceed current requirements (NRC, 1998) for lactating sows. The glauber salt premix was purchased from XF Enterprises Inc. of Greeley, Colo. and included glauber salt, carrier, mineral oil and mold inhibitor. Feed was provided according to sow's body condition on d 109 to farrowing. After parturition, sows were fed ad libitum throughout lactation. Water was available always. Feed intake and feed refusal were noted on a daily basis. Sow weight and backfat measurements were recorded on d 109 of gestation, within 24 hr after parturition and at the weaning. Litter size and pig weight at birth and at weaning were determined. When needed, cross-fostering was done during the first 48-h after farrowing. Cross-fostered pigs were weighed and the adjustments made to the donor and recipient sows accordingly to ensure accurate litter load for the sows. Piglet mortality was also recorded. Wean to mating interval for the sows was recorded. This trial was conducted during the months of September to October.

Results:

Although differences in number of pigs weaned per sow and pre-weaning mortality between treatment groups were not statistically significant (P>0.1), sows receiving the diets containing Glauber salts had numerically greater number of pigs weaned (9.76 vs 10.52) and lower pre-weaning mortality (21.3 vs 15.2) than sows receiving the control diet as shown in Table 2 below.

TABLE 2

Effects of Glauber salts on litter performance

| | Treatment | | |
|---|---|---|---|
| | Control | Glauber Salt | SEM |
| No. of sows | 13 | 13 | |
| Parity | 3.23 | 3.23 | |
| Lact. Length, d | 19.9 | 19.6 | 0.36 |
| Pigs after transfer | 12.54 | 12.38 | 0.20 |
| Pigs at WN$^b$ | 9.76 | 10.52 | 0.42 |
| Pre-WN Mort, %$^b$ | 21.3 | 15.2 | 3.35 |
| LT WT after Tran, lb | 39.6 | 39.6 | 1.27 |
| LT WT at WN, lb$^{cd}$ | 143$^f$ | 162$^g$ | 7.48 |
| LT WT gain, lb$^{cd}$ | 104.2$^f$ | 123.2$^g$ | 7.48 |
| Pig WT after Tran, lb | 3.16 | 3.20 | 0.09 |
| Pig WT at WN, lb$^{ce}$ | 14.7 | 15.4 | 0.36 |

$^b$Number of pigs after transfer was used as covariance
$^c$Lacatation length was used as covariance
$^d$LT wt after transfer was used as covariance
$^e$Pig wt after transfer was used as covariance
$^{fg}$Means in the same row with different superscript differ (P < 0.1)

Feeding Glauber salts also improved (P<0.1) litter weaning weights and litter weight gains.

Figure 2:
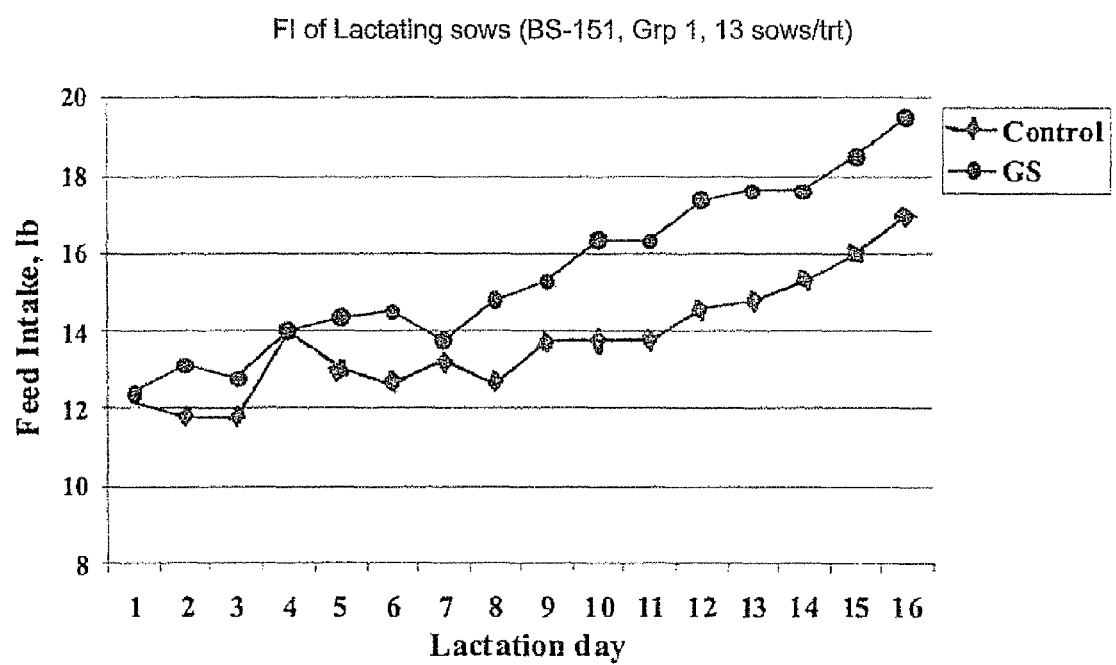
FIG. 2 shows the effect of Glauber salts on daily sow feed intake.

Sows receiving the diet containing Glauber salts had greater feed intake (11.4% improvements) than sows fed the control diet as shown in Table 3 below. Daily feed intake from day 1 through day 16 of lactation is shown in FIG. 2. Sows fed Glauber salts gained weight during lactation while sows receiving the control diet lost weight (See Table 3).

TABLE 3

Effect of Glauber salts on sow performance

| | Treatment | | |
|---|---|---|---|
| | Control | Glauber Salt | SEM |
| No. of sows, lb | 13 | 13 | |
| Parity | 3.23 | 3.23 | |
| Sow wt at farrow, lb | 583 | 559 | 21.9 |
| Sow wt at wn, lb$^{bc}$ | 581 | 595 | 8.45 |
| Sow wt change, lb$^{bc}$ | -2.61 | 10.91 | 8.45 |
| ADFI d 109-farrow | 4.71 | 4.88 | 0.18 |
| ADFI d I-WN, lb | 14.03 | 15.63 | 0.837 |
| Total feed intake lactation, lb | 279 | 304 | 0.867 |

$^b$Lacatation length was used as covariance
$^c$Sow wt at farrowing was used as covariance The results of this study show that Glauber salts had an effect on lactation feed intake, and on sow and litter performance.

Example 2

This study was conducted to evaluate the effect of Glauber salts at two room temperatures on lactation feed intake and on sow and litter performance.

Procedures:

Approximately, 120 sows (30 sows/trt) from three farrowing groups were used (40 sows per farrowing group). Experiment started when sows were moved to the farrowing crates (≅5-7 days before farrowing) and continued through lactation. Dietary treatments were arranged as a 2×2 factorial with two diets (with and without Glauber salts) and two room temperatures (68 and 82° F.). Specific treatments were:

1) A corn control diet (Table 1) at 82° F. room temperature
2) Control diet plus Glauber salts (Table 1) at 82° F. room temperature
3) Control diet at 68° F. room temperature, and
4) Control diet plus Glauber salts at 68° F. room temperature Sows were housed in four farrowing rooms per farrowing group with 10 farrowing crates per room. Ventilation in each farrowing room was set to maintain 68° F. or 82° F. depending on the treatment. The two dietary treatments were randomly assigned to crates within each room.

All nutrients were supplied in the diets to meet or exceed current requirements (NRC, 1998) for lactating sows. Feed was provided according to sow's body condition on d 109 to farrowing. After parturition, sows were fed ad libitum throughout lactation. Water was available always. Feed intake and feed refusal were noted on a daily basis. Sow weight and backfat measurements were recorded on d 109 of gestation, within 24 hr after parturition and at weaning. Litter size and pig weight at birth and at weaning were determined. When needed, cross-fostering was done during the first 48-h after farrowing. Cross-fostered pigs were weighed and the adjustments made to the donor and recipient sows accordingly to ensure accurate litter load for the sows. Piglet mortality was also recorded. Wean to mating interval for the sows was recorded.

Room temperature had a negative effect on number of pigs weaned and pre-weaning mortality as shown in Table 4.

TABLE 4

Effect of Glauber salts and room temperature on litter performance

|  | 82° F. Control | 82° F. GS | 68° F. Control | 68° F. GS | SEM |
|---|---|---|---|---|---|
| No. of sows | 28 | 29 | 30 | 30 |  |
| Parity | 2.89 | 2.83 | 2.70 | 2.73 |  |
| Lact. Length, d | 18.9 | 19.5 | 19.4 | 19.5 | 030 |
| Pigs after transfer | 12.46 | 12.93 | 12.63 | 12.77 | 0.19 |
| Pigs at WN$^{bf}$ | 10.38 | 10.91 | 11.17 | 11.16 | 0.25 |
| Pre-WN Mort, %$^{bf}$ | 17.77 | 13.67 | 11.52 | 11.83 | 2.0 |
| LT WT after Tran, lb | 38.2 | 39.8 | 38.7 | 39.9 | 1.01 |
| LT WT at WN, lb$^{cdf}$ | 151 | 155 | 163 | 164 | 4.18 |
| LT WT gain, lb$^{cdf}$ | 111.7 | 115.4 | 123.5 | 124.7 | 4.18 |
| Pig WT after Tran, lb | 3.06 | 3.09 | 3.08 | 3.13 | 0.08 |
| Pig WT at WN, lb$^{ce}$ | 14.45 | 14.34 | 14.58 | 14.58 | 0.27 |

$^b$Number of pigs after transfer was used as covariance
$^c$Lacatation length was used as covariance
$^d$LT wt after transfer was used as covariance
$^e$Pig wt after transfer was used as covariance
$^f$Room temperature effect P < 0.05

Sows housed at 82° F. weaned less pigs (P<0.05) and had greater pre-weaning mortality (P<0.05) than sows housed at 68° F. Sows receiving Glauber salts and housed at 82° F. had lower pre-weaning mortality and weaned more pigs than sows receiving the control diet and housed at 82° F. Glauber salts, however, had no effect on pre-weaning mortality or number of pigs weaned per sow when sows were housed at 68° F.

Lactation feed intake was affected by room temperature as shown in Table 5.

TABLE 5

Effect of Glauber salts and room temperature on sow performance

|  | 82° F. Control | 82° F. GS | 68° F. Control | 68° F. GS | SEM |
|---|---|---|---|---|---|
| No. of sows, lb | 28 | 29 | 30 | 30 |  |
| Parity | 2.89 | 2.83 | 2.70 | 2.73 |  |
| Sow wt at farrow, lb | 542 | 550 | 525 | 538 | 14.29 |
| Sow wt at wn, lb$^{bcd}$ | 525 | 520 | 546 | 552 | 4.09 |
| Sow wt at change, lb$^{bcd}$ | −14.53 | −19.14 | 6.04 | 12.27 | 4.09 |
| Feed Intake d 109-farrow | 5.02 | 4.82 | 5.11 | 5.11 | 0.136 |
| Total feed intake$^{de}$ | 244 | 272 | 307 | 321 | 10.7 |
| FI d 1-WN, lb$^{de}$ | 12.91 | 13.93 | 15.81 | 16.44 | 0.47 |

$^b$Lacatation length was used as covariance
$^c$Sow wt at farrowing was used as covariance
$^d$Room Temperature effect P < 0.05
$^e$Diet effect P < 0.08

Figure 3:
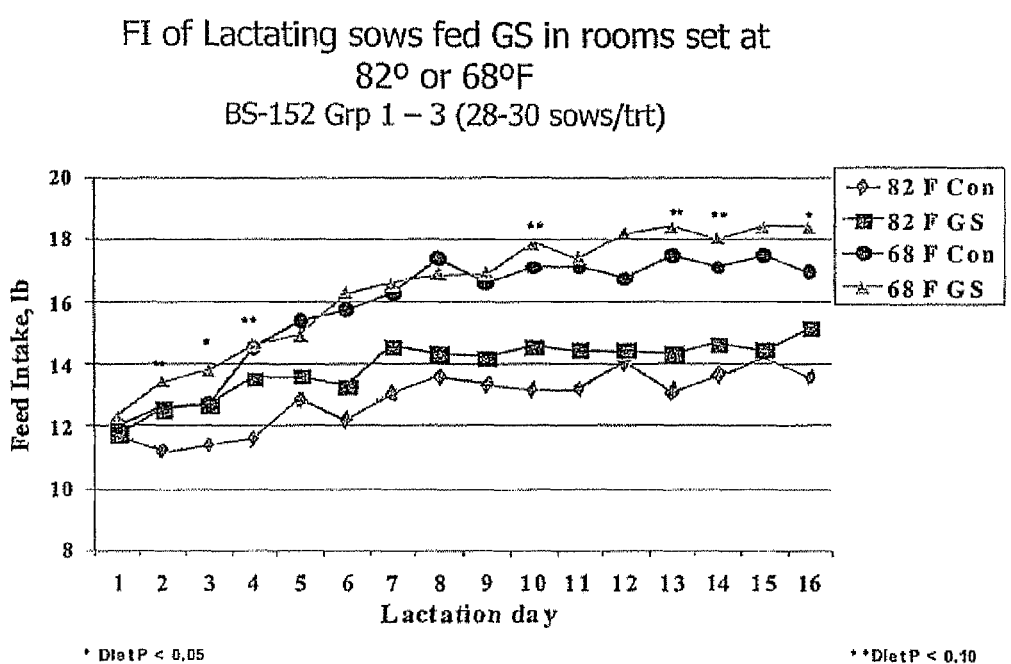
FIG. 3 shows the effect of Glauber salts and room temperature on daily feed intake.

Sows housed at 82° F. had lower (temperature effect, P<0.05) daily feed intake (day 1 postfarrowing through weaning) than sows housed at 68° F., and sows receiving Glauber salts had greater (diet effect, P<0.08) daily feed intakes than sows receiving the control diet. The effect of Glauber salts on feed intake was greater in sows housed at 82° F. than in sows housed at 68° F. Daily feed intake from day 1 through day 16 of lactation is shown in FIG. 3.

Sow weight change was also affected by room temperature (Table 5). Sows at 82° F. fed glauber salts and the sows fed control diet at 82° F. did not have a statistically significant weight difference. However, when data was compiled from 5 different trials, as in Table 6, the sows at 82° F. fed glauber salts had a greater litter weight gain than the sows fed control diet at 82° F.

TABLE 6

Litter Performance (82° F. Environment)
(5 groups/50-51 sows/treatment)

|  | Control | Test Diet | SEM | P value |
|---|---|---|---|---|
| No. of sows | 50 | 51 |  |  |
| Parity | 3.02 | 3.18 |  |  |
| Lact. Length, d | 19.3 | 19.4 | 0.204 |  |
| Pigs after transfer | 12.34 | 12.61 | 0.132 |  |
| Pigs at WN$^b$ | 10.14$^f$ | 10.738 | 0.20 | 0.04 |
| Pre-WN Mort, %$^b$ | 18.3$^f$ | 13.68 | 1.65 | 0.05 |
| LT WT after Tran, lb | 38.4 | 39.4 | 0.72 |  |
| LT WT at WN, lb$^{cd}$ | 148$^h$ | 156$^i$ | 3.23 | 0.11 |
| LT WT gain, lb$^{cd}$ | 109.5$^h$ | 116.8$^i$ | 3.23 | 0.11 |
| Pig WT after Tran, lb | 3.16 | 3.14 | 0.06 |  |
| Pig WT at WN, lb$^{ce}$ | 14.58 | 14.65 | 0.18 |  |

$^b$Number of pigs after transfer was used as covariance
$^c$Lactation length was used as covariance
$^d$LT wt after transfer was used as covariance
$^e$Pig wt after transfer was used as covariance
$^{fg}$Means in the same row with different superscript differ (P < 0.05)
$^{hi}$Means in the same row with different superscript differ (P = 0.11)

The results of these studies indicate that high ambient temperature decreases lactation feed intake and negatively affects sow and litter performance. These results also suggest that the positive effect of Glauber salts on lactation feed intake, and on sow and litter performance is greater during high ambient temperatures.

Although the present invention has been described with reference to preferred embodiments, workers skilled in the art will recognize that changes may be made in form and detail without departing from the spirit and scope of the invention.

What is claimed is:

1. A method of feeding lactating sows experiencing heat stress, comprising:
providing lactating sows an animal feed during conditions of heat stress, the animal feed comprising sodium sulfate decahydrate having a concentration between about 0.6 percent by weight of the feed and about 2.5 percent by weight of the feed, the animal feed provided from farrowing to weaning.

2. The method of claim 1 wherein farrowing to weaning comprises between about 14 days and about 28 days.

3. The method of claim 1 wherein the concentration of sodium sulfate decahydrate in the animal feed is between 0.6 percent by weight of the feed and about 1.25 percent by weight of the feed.

4. The method of claim 1 wherein the animal feed is provided ad libitum to the lactating sows.

5. The method of claim 4 wherein the sows consume on average at least about 12 pounds of feed per day.

6. The method of claim 1 wherein the sows consume at least about 1.2 ounces of sodium sulfate decahydrate per day.

7. The method of claim 1, wherein the animal feed is provided to increase feed intake of the lactating sows.

8. The method of claim 7 wherein the average daily feed intake of the sows is increased by at least about 5 percent.

9. The method of claim 7 wherein the average daily feed intake of the sows is increased by at least about 10 percent.

10. The method of claim 7, further comprising observing heat stress in the lactating sows prior to providing the animal feed.

* * * * *

UNITED STATES PATENT AND TRADEMARK OFFICE
CERTIFICATE OF CORRECTION

PATENT NO. : 9,237,759 B1  
APPLICATION NO. : 12/607603  
DATED : January 19, 2016  
INVENTOR(S) : Brenda de Rodas et al.

Page 1 of 1

It is certified that error appears in the above-identified patent and that said Letters Patent is hereby corrected as shown below:

SPECIFICATION

| Column | Line | PTO | Should Be |
|---|---|---|---|
| 6 | 54 | "ADFI d I-WN, lb" [7th row in Table 3, first column] | -- ADFI d 1-WN, lb -- |
| 7 | 45 | "030" [3rd row in Table 4, under column SEM] | -- 0.30 -- |
| 8 | 12 | "Total feed intake$^{dc}$" [7th row in Table 5, first column] | -- Total feed intake$^{de}$ -- |
| 8 | 13 | "FI d 1-WN, lb$^{dc}$" [8th row in Table 5, first column] | -- FI d 1-WN, lb$^{de}$ -- |
| 8 | 45 | "10.738" [5th row in Table 6, under column Test Diet] | -- 10.73$^{g}$ -- |
| 8 | 46 | "13.68" [6th row in Table 6, under column Test Diet] | -- 13.6$^{g}$ -- |

Signed and Sealed this  
Nineteenth Day of April, 2016

Michelle K. Lee  
*Director of the United States Patent and Trademark Office*